United States Patent
Pinera et al.

(10) Patent No.: US 7,748,959 B1
(45) Date of Patent: Jul. 6, 2010

(54) INSULATED TURBINE DISC OF A TURBO-PUMP

(75) Inventors: Alex Pinera, Jupiter, FL (US); Todd A. Ebert, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 668 days.

(21) Appl. No.: 11/787,559

(22) Filed: Apr. 17, 2007

Related U.S. Application Data

(60) Provisional application No. 60/794,174, filed on Apr. 20, 2006.

(51) Int. Cl.
*F01D 5/08* (2006.01)
(52) U.S. Cl. .................................................. 416/244 A
(58) Field of Classification Search ............. 416/244 A, 416/95, 224, 232, 248, 229 A; 415/216.1
See application file for complete search history.

(56) References Cited

U.S. PATENT DOCUMENTS

| | | | |
|---|---|---|---|
| 2,401,826 A | 6/1946 | Halford | |
| 2,598,176 A | 5/1952 | Johnstone | |
| 2,599,470 A * | 6/1952 | Meyer | 60/39.093 |
| 2,635,805 A * | 4/1953 | Baumann | 416/96 R |
| 2,858,102 A | 10/1958 | Bloomberg | |
| 2,928,650 A | 3/1960 | Hooker et al | |
| 3,814,539 A | 6/1974 | Klompas | |
| 4,102,603 A | 7/1978 | Smith et al. | |
| 4,364,717 A * | 12/1982 | Schippers et al. | 417/407 |
| 5,209,652 A | 5/1993 | Fischer et al. | |
| 5,403,165 A | 4/1995 | Lehe et al. | |
| 5,529,464 A | 6/1996 | Emerson et al. | |
| 6,213,720 B1 * | 4/2001 | Farmer | 416/229 A |
| 6,276,896 B1 | 8/2001 | Burge et al. | |
| 7,334,999 B2 * | 2/2008 | Aumont et al. | 416/248 |
| 2007/0271784 A1 * | 11/2007 | Fabre | 29/889.2 |

* cited by examiner

*Primary Examiner*—Richard Edgar
(74) *Attorney, Agent, or Firm*—John Ryznic

(57) ABSTRACT

A turbine disc used in a turbo-pump that is exposed to a large thermal gradient across the sides of the rotor disc. The warm side of the turbine disc is covered by a cover plate that forms a sealed space between the turbine disc and the cover plate, and this space is evacuated or insulated to form a complete vacuum or as near as a complete vacuum as possible. The surfaces of the turbine disc and cover plate that form the vacuum space are also coated with a reflective coating such as with a highly polished surface of low emissivity in order to minimize the radiation heat loss through the vacuum space. The turbine disc can have a cover plate forming a vacuum space or insulated cavity on both sides of the turbine disc. Ribs are also used within the vacuum space as supports for the cover plate due to the difference in pressure from the ambient side and the vacuum.

16 Claims, 1 Drawing Sheet

INSULATED TURBINE DISC OF A TURBO-PUMP

CROSS-REFERENCE TO RELATED APPLICATIONS

This application claims the benefit to an earlier filed U.S. Provisional application Ser. No. 60/794,174 filed on Apr. 4, 2006 and entitled INSULATED TURBINE DISC OF A TURBOPUMP.

BACKGROUND OF THE INVENTION

1. Field of the Invention

The present invention relates to a turbo-pump, and more specifically to an insulated turbine disc of the turbopump.

2. Description of the Related Art Including Information Disclosed Under 37 CFR 1.97 and 1.98

Turbo pumps are used in rocket engines to boost the pressure of the propellant that is being pumped in order to either cool the engine nozzle and combustion chamber and/or to introduce the propellants into the combustion chamber at high pressure. U.S. Pat. No. 5,403,165 issued to Lehe et al on Apr. 4, 1995 and entitled COMPACT HIGH POWER TURBOPUMP FOR A ROCKET ENGINE; U.S. Pat. No. 5,209,652 issued to Fischer et al on May 11, 1993 and entitled COMPACT CRYOGENIC TURBOPUMP; and U.S. Pat. No. 5,529,464n issued to Emerson et al on Jun. 25, 1996 and entitled CRYOGENIC TURBOPUMP show examples of turbopumps that pump a cryogenic fuel. Each of these three references is incorporated herein by reference. One of the major problems of turbo-pumps of the prior art is that the turbine disc is exposed to the cold temperature on one side of the rotor disc and a hot temperature of the other side. Thus, one side of the turbine disc is exposed to the propellant temperature while the opposed side is exposed to the turbine drive gas temperature. This large temperature difference—from about 330 to 1000 degrees F.—will cause the disc to warp in a parabolic shape toward the cold side of the disc. This warping can lead to shortened lifetime for parts, running clearance problems, and a host of other problems.

One prior art reference, U.S. Pat. No. 6,276,896 issued to Burge et al on Aug. 21, 2001 and entitled APPARATUS AND METHOD FOR COOLING AXI-CENTRIFUGAL IMPELLER discloses a centrifugal pump impeller with a shield plate covering a side of the impeller opposite to that of the blades. The cover plate forms a plurality of cooling air cavities in the space formed between the rotor disc and the cover plate. Cooling air is passed through the cavities in order to cool the impeller. The difference between the present invention and the Burge et al patent is that Burge patent requires cooling air while the present invention does not. The use of cooling air (or a cooling fluid) usually introduces additional losses into the system and requires additional design innovation to route the cooling gas into and out of the rotor disc.

An object of the present invention is to provide for a turbo-pump with an insulated surface such that high temperature differences across the turbine disc will not cause significant warping.

Another object of the present invention is to provide for a turbo-pump with a sealed cavity that does not require cooling fluid to reduce the heat transfer rate across the turbine disc.

BRIEF SUMMARY OF THE INVENTION

The present invention is a turbine disc used in a turbopump that is exposed to a large thermal gradient across the sides of the rotor disc. The warm side of the turbine disc is covered by a cover plate that forms a sealed space between the turbine disc and the cover plate, and this space is evacuated or insulated to form a complete vacuum or as near as a complete vacuum as possible. The surfaces of the turbine disc and cover plate that form the vacuum space are also coated with a reflective coating such as with a highly polished surface of low emissivity in order to minimize the radiation heat loss through the vacuum space. The turbine disc can have a cover plate forming a vacuum space or insulated cavity on both sides of the turbine disc. Ribs are also used within the vacuum space as supports for the cover plate due to the difference in pressure from the ambient side and the vacuum.

DETAILED DESCRIPTION OF THE INVENTION

Figure 1:
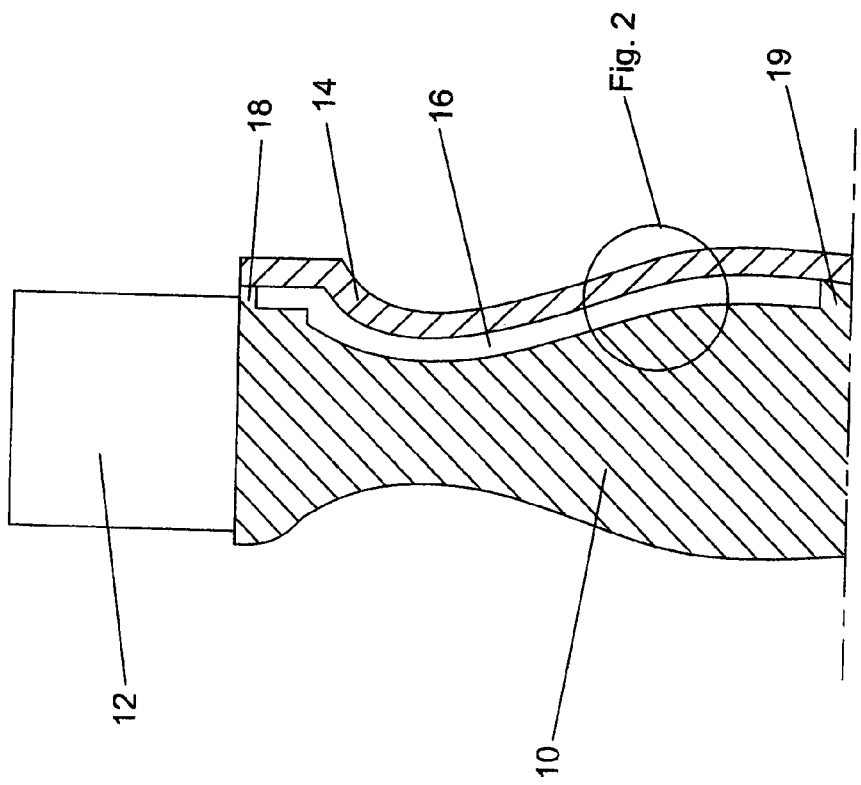
FIG. 1 shows a cross section view of a turbine disc of the present invention having a cover plate on a warm side that forms an insulation space.

The turbo-pump of the present invention used to pump a propellant such as liquid hydrogen or liquid oxygen includes a turbine disc (usually a first stage turbine disc) connected by a rotor shaft to the pump section of the turbopump. FIG. 1 shows the turbine disc of the present invention, which includes a rotor disc 10 that supports a plurality of turbine blades 12. One side of the turbine disc (left side in FIG. 1) is exposed to the cold propellant due to leakage in the turbopump. An opposite side of the turbine disc 10 includes a cover plate 14 that is supported by ribs 18 and 19 extending from the disc. This cover plate side of the turbine disc is exposed to heat from combustion of the propellant. A space 16 is formed between the turbine disc 10 and the cover plate 14. The space 16 is evacuated of air to form as near as a complete vacuum as possible, or the space 16 can be filled with insulation.

Figure 2:
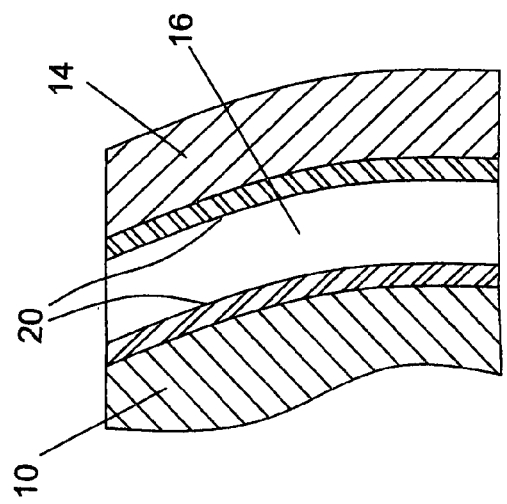
FIG. 2 shows a blown-up section of the insulated chamber of FIG. 1.

The turbine disc 10 and the cover plate can be made of the same or different material. In the present invention, the turbine disc 10 and the cover plate 14 are both made of a metallic material such as steel or Inco. Also, only two ribs are shown in FIG. 1, inner rib 19 and out rib 18. The purpose of the ribs is to prevent the cover plate 14 from collapsing under the pressure difference between the outer surface of the cover plate and the vacuum within the space 16. Additional ribs can be placed between the inner 19 and outer 18 ribs to provide the minimum support. The surfaces of the rotor disc 10 and the cover plate 14 that form the cavity or space 16 are each coated with a reflective coating 20 in order to reduce radiation leakage across the rotor disc and cover plate assembly. The coating 20 is a low emissivity, highly polished material. FIG. 2 shows a detailed drawing of the cavity 16 and coatings 20 on the two surfaces. The coating 20 can also serve as a means of minimizing or eliminating material out-gassing.

The present invention has been described as a turbo-pump for a rocket engine in which the turbine disc includes a cover plate with a vacuum cavity to reduce heat transfer across the turbine disc. However, the present invention can also be used in rotor discs that are used for other purposes than rocket motors in which a large thermal gradient exists across the turbine disc.

We claim the following:

1. A turbine disc comprising:
   a rotor disc with a plurality of rotor blades extending from the rotor disc; and,
   a sealed cavity formed on one side of the rotor disc and having a partial vacuum to reduce heat transfer across the rotor disc; and,
   the sealed cavity is on a hot side of the turbine disc opposite to a rotor shaft.

2. The turbine disc of claim 1, and further comprising:
   the sealed cavity is formed by a cover plate secured to the turbine disc.

3. The turbine disc of claim 2, and further comprising:
   the inside surfaces of the cavity and the cover plate are coated with a reflective coating to reduce radiation leakage across the turbine disc.

4. The turbine disc of claim 2, and further comprising:
   at least one rib to support the cover plate from collapsing under a pressure difference due to the partial vacuum within the cavity.

5. The turbine disc of claim 2, and further comprising:
   the rotor disc and the cover plate are formed of substantially the same material such that stress from thermal differences is minimized.

6. The turbine disc of claim 1, and further comprising:
   a surface of the sealed cavity is coated with a reflective coating to reduce radiation leakage across the turbine disc.

7. The turbine disc of claim 6, and further comprising:
   the coating is a low emissivity and highly polished material.

8. The turbine disc of claim 1, and further comprising:
   the cavity is formed over substantially the entire side of the rotor disc.

9. The turbine disc of claim 8, and further comprising:
   a cover plate secured to one side of the rotor disc and forming the cavity.

10. The turbine disc of claim 9, and further comprising:
    at least two ribs to support the cover plate from collapsing due to the partial vacuum within the cavity, one of the ribs being near the axial center of the disc and the other rib extending around the outer circumference of the rotor disc.

11. The turbine disc of claim 1, and further comprising:
    the sealed cavity is substantially filled with an insulating material.

12. The turbine disc of claim 1, and further comprising:
    the turbine disc is a turbopump for a rocket engine with the cold side exposed to a cryogenic liquid and the hot side exposed to a combustion of the cryogenic liquid.

13. An axial flow turbine disc comprising:
    a rotor disc;
    a plurality of axial flow blades extending outward from the rotor disc;
    a rotor shaft extending from one side of the rotor disc;
    a sealed cavity formed on an opposite side of the rotor disc and on substantially the entire surface and having a partial vacuum to reduce heat transfer across the rotor disc.

14. The axial flow turbine disc of claim 13, and further comprising:
    The sealed cavity covers substantially the entire side of the rotor disc from the blades to the axial center of the rotor disc.

15. The axial flow turbine disc of claim 14, and further comprising:
    the sealed cavity is formed by a cover plate secured to the turbine disc.

16. The axial flow turbine disc of claim 13, and further comprising:
    at least two ribs to support the cover plate from collapsing due to the partial vacuum within the cavity, one of the ribs being near the axial center of the disc and the other rib extending around the outer circumference of the rotor disc.

* * * * *